(12) United States Patent
King

(10) Patent No.: US 7,862,069 B2
(45) Date of Patent: Jan. 4, 2011

(54) BASKET STRUCTURE FOR CHILD'S STROLLER

(75) Inventor: Derek A. King, Elverson, PA (US)

(73) Assignee: Wonderland Nurserygoods Co., Ltd, Taipei (TW)

( * ) Notice: Subject to any disclaimer, the term of this patent is extended or adjusted under 35 U.S.C. 154(b) by 302 days.

(21) Appl. No.: 11/747,878

(22) Filed: May 11, 2007

(65) Prior Publication Data

US 2008/0277439 A1 Nov. 13, 2008

(51) Int. Cl.
*B62B 9/26* (2006.01)
(52) U.S. Cl. .................. 280/650; 280/642; 280/647; 280/657; 280/658
(58) Field of Classification Search .................. 280/638, 280/639, 38, 39, 641, 642, 42, 647, 650, 280/657, 658
See application file for complete search history.

(56) References Cited

U.S. PATENT DOCUMENTS

| | | | | |
|---|---|---|---|---|
| 4,346,912 A | * | 8/1982 | Habib | 280/644 |
| 5,938,230 A | * | 8/1999 | Huang et al. | 280/650 |
| 6,273,451 B1 | * | 8/2001 | Julien et al. | 280/642 |
| 6,402,186 B1 | * | 6/2002 | Garland | 280/647 |
| D514,036 S | * | 1/2006 | Fox et al. | D12/129 |
| 2002/0005628 A1 | * | 1/2002 | Hartenstine et al. | 280/647 |
| 2005/0161912 A1 | * | 7/2005 | Cheng et al. | 280/647 |
| 2005/0242549 A1 | * | 11/2005 | Longenecker et al. | 280/642 |
| 2005/0258618 A1 | * | 11/2005 | Kassai et al. | 280/642 |
| 2006/0006629 A1 | * | 1/2006 | Riedl et al. | 280/642 |

* cited by examiner

*Primary Examiner*—J. Allen Shriver, II
*Assistant Examiner*—Bryan A Evans
(74) *Attorney, Agent, or Firm*—Miller Law Group, PLLC

(57) ABSTRACT

A basket structure for a stroller is formed with a basket tube extending around the upper surface of the basket structure from one seat tube to the laterally opposing seat tube. The basket tube is a single formed tubular member that extends rearwardly from the seat tubes and bends downwardly at a rearward end thereof to define an access opening. The formed basket tube is depressed at the access opening below the surface against which the seat back is located when lowered into a reclined position. The access opening, therefore, remains open and allows access into the interior of the basket, even when the seat back is reclined, without disturbing the child positioned in the seat.

15 Claims, 10 Drawing Sheets

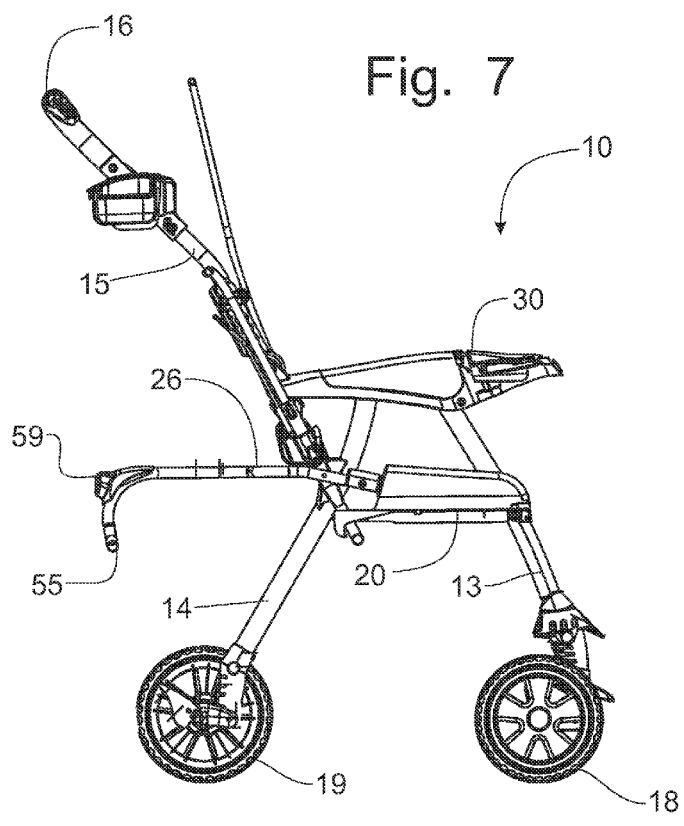
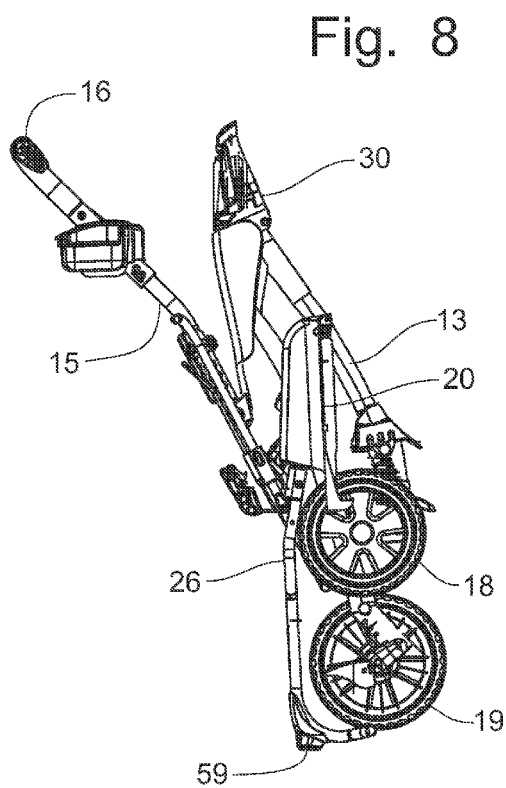

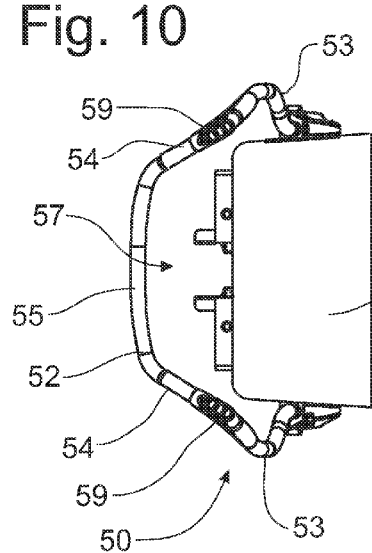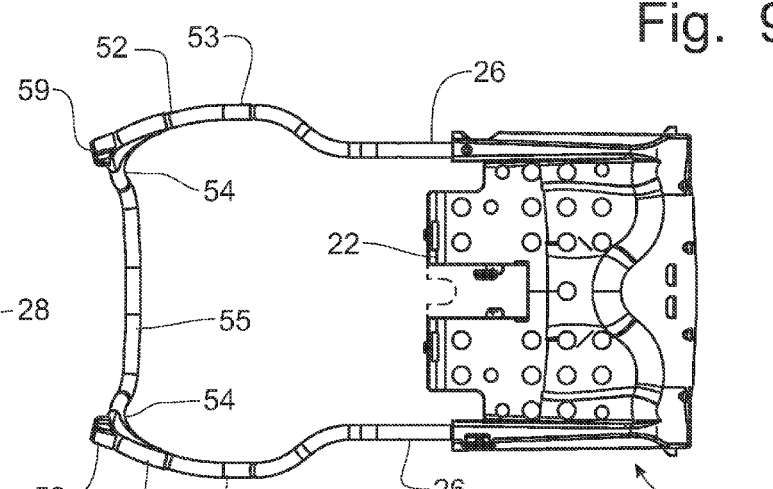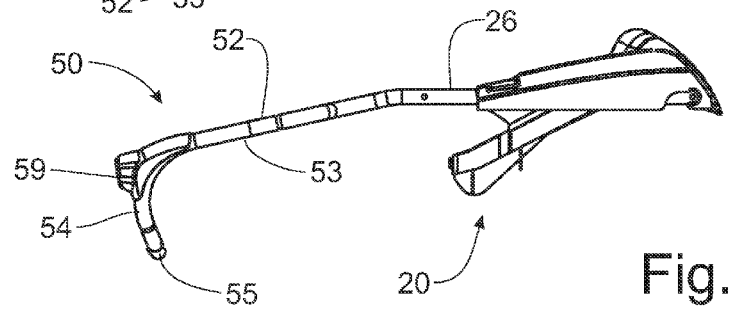

Fig. 13
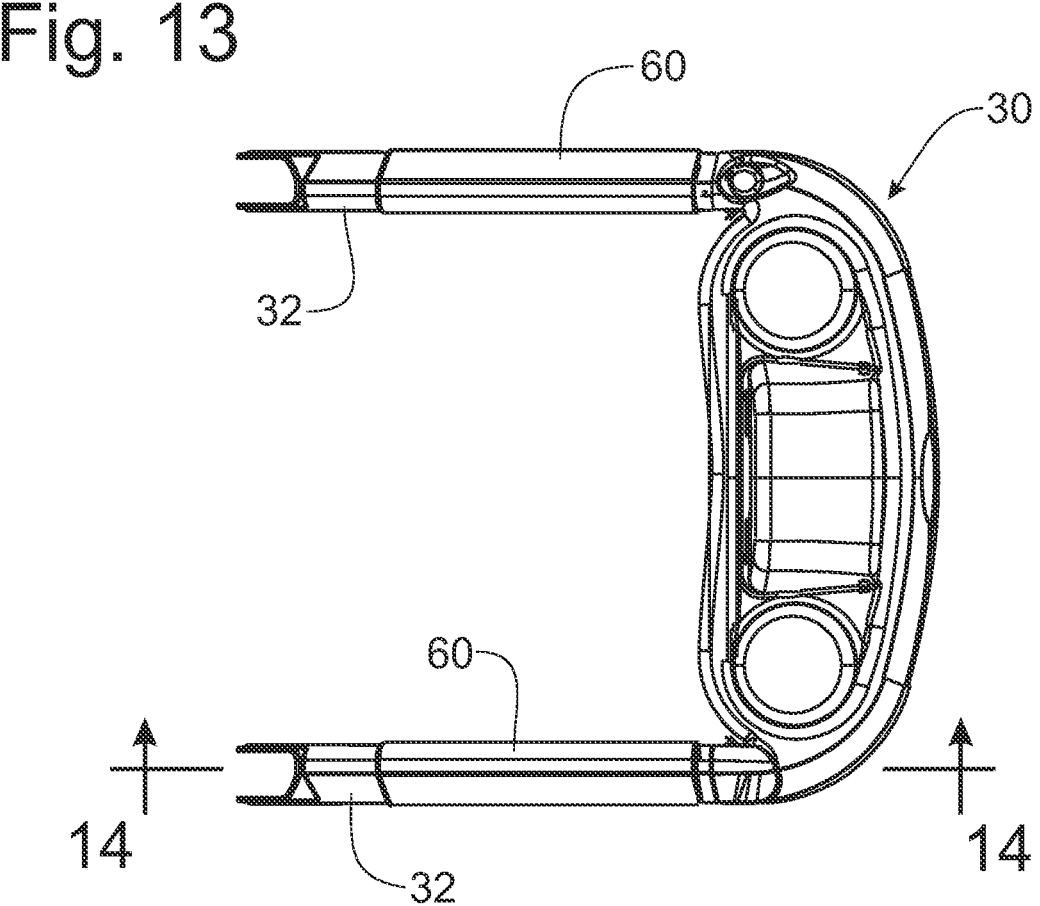
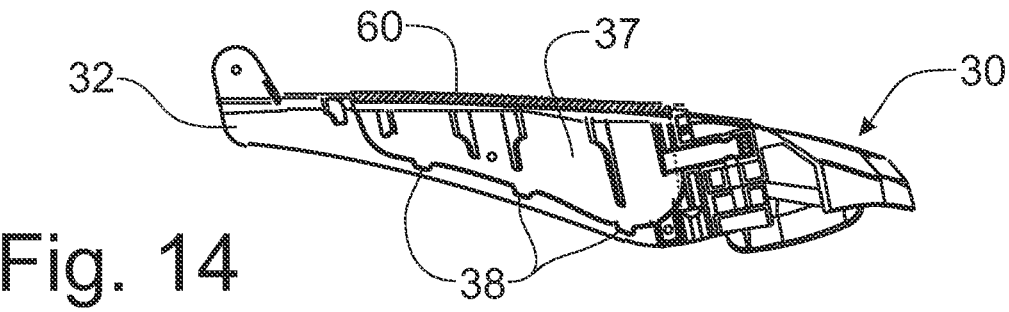
Fig. 14
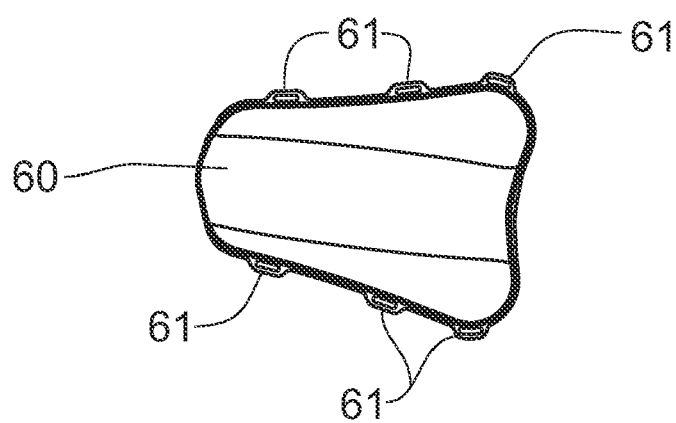
Fig. 15

BASKET STRUCTURE FOR CHILD'S STROLLER

FIELD OF THE INVENTION

The present invention relates generally to a stroller for use in transporting young children, and, more particularly, to a basket structure that will improve access into the interior of the basket, particularly when the seat back is lowered into a reclined position adjacent the basket.

BACKGROUND OF THE INVENTION

Strollers for transporting young children are commercially available in many styles and configurations. Strollers are normally configurable in an operative position in which the child is placed on a seat forming part of the stroller to be transported from one place to another by a caregiver pushing the stroller manually, and in a compact storage configuration in which the stroller is folded into a position in which the frame is collapsed and is unusable for the normal function of transporting young children until the stroller is returned to the operative position. These strollers can be folded from the operative configuration into the storage configuration in a number of different ways to achieve a storable size for the stroller frame.

A basket is typically supported from the frame of the stroller below the seat in which the child is positioned. The basket provides limited carrying capacity for loose items, a diaper bag, a purse, etc. that are desired to be available while the child is being transported by the stroller. The seat is normally provided with a seat back that is positionable in a reclined position to define a substantially horizontal, planar surface on which the child being transported can sleep. When the seat back is reclined, the seat back is lowered into engagement with the basket structure, resulting in little or no access into the interior of the basket until the seat back is raised again.

Accordingly, it would be desirable to provide an improved basket structure that will provide improved access into the interior of a stroller basket, particularly when the seat back is lowered into a reclined position against the basket structure.

The arm rest on a stroller is a highly utilized component of a child's stroller. Not only does the child lean on the arm rest, but the arm rest is grasped with dirty hands and is otherwise subject to having food and drinks spilled on it. Sometimes a child will chew on the arm rest or rest his or her head on it and even fall asleep on the arm rest. Forming the arm rest as part of the frame of the stroller establishes the arm rest as a rather rigid, uncomfortable plastic member. Accordingly, it would be desirable to provide arm rests for children's strollers that provide some comfort in the engagement with the surface of the arm rest, while providing the ability to clean the arm rest as needed.

SUMMARY OF THE INVENTION

It is an object of this invention to overcome the disadvantages of the prior art by providing a basket structure for a stroller used for transporting children along the surface of the ground.

It is another object of this invention to provide a basket structure that can be accessed when the seat back is lowered into a reclined position against the basket structure.

It is a feature of this invention that the stroller basket structure includes a formed basket tube that extends rearwardly from the seat assembly to define a recessed area along the rearward end of the basket.

It is another feature of this invention that the basket tube is bent downwardly along the rearward end of the stroller basket structure to define an access opening that is not closed when the stroller seat back is lowered into the reclined position.

It is an advantage of this invention that the stroller basket can be accessed without disturbing the child positioned in the stroller seat.

It is still another feature of this invention that the stroller basket can be formed with feet that will help support the stroller when folded into a compact storage position.

It is yet another feature of this invention that the basket tube is formed as a single tubular member extending from one seat tube to the laterally opposing seat tube.

It is yet another advantage of this invention that the formed basket tube provides a unique, pleasing aesthetic appearance.

It is still another object of this invention to provide an arm rest structure for a child's stroller that establishes a soft surface that can be easily cleaned or replaced.

It is yet another feature of this invention that the arm rest structure which is part of the stroller frame is formed with a shaped relief surface to receive an arm rest insert thereon.

It is still another feature of this invention that a soft material insert member can be attached to the arm rest frame within a relief insert area to provide a comfortable arm rest surface for a child's stroller.

It is still another advantage of this invention that the depth of the relief insert area is substantially equal to the thickness of the soft material insert member to allow the soft material insert to be at the same surface level as the plastic arm rest frame adjacent to the relief insert area.

It is yet another advantage of this invention that the soft material insert member can be removed from the stroller frame and cleaned.

It is a further advantage of this invention that the soft material insert member on a stroller arm rest can be easily replaced.

It is a further feature of this invention that the soft material insert can be constructed from ethyl vinyl acetate (EVA) to provide a soft, durable and cleanable surface for the stroller arm rest.

It is still a further feature of this invention that the soft material insert member includes openings engagable with tabs formed on the arm rest frame structure to retain the soft material insert member in place on the relief insert area.

It is yet another object of this invention to provide a basket structure for a stroller, which is durable in construction, inexpensive of manufacture, carefree of maintenance, facile in assemblage, and simple and effective in use.

It is a further object of this invention to provide a soft material insert member for a stroller arm which is durable in construction, inexpensive of manufacture, carefree of maintenance, facile in assemblage, and simple and effective in use.

These and other objects, features and advantages are accomplished according to the instant invention by providing a basket structure for a stroller in which the basket is formed with a basket tube extending around the upper surface of the basket structure from one seat tube to the laterally opposing seat tube. The basket tube is a single formed tubular member that extends rearwardly from the seat tubes and bends downwardly at a rearward end thereof to define an access opening. The formed basket tube is depressed at the access opening below the surface against which the seat back is located when lowered into a reclined position. The access opening, therefore, remains open and allows access into the interior of the basket, even when the seat back is reclined, without disturbing the child positioned in the seat.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a cross-sectional view taken through the center of the stroller corresponding to lines 7-7 of FIG. 2 to show a side elevational view of the stroller frame, including the basket structure;

FIG. 8 is a cross-sectional view similar to that of FIG. 7 to show a side elevational view of the stroller depicted in FIG. 5, but in the folded configuration;

FIG. 9 is a top plan view of the basket and seat frame assembly from the embodiment of FIG. 1;

FIG. 10 is a rear projection of the basket and seat frame relative to the top plan view of FIG. 9, the seat back being superimposed in a reclined orientation to display the access the basket frame provides into the basket structure;

FIG. 11 is a side elevation projection of the basket and seat frame relative to the top plan view of FIG. 9;

FIG. 13 is a top plan view of the tray and armrest assembly for the stroller;

FIG. 14 is a cross-sectional view through the center of the right armrest taken along lines 14-14 of FIG. 13; and FIG. 15 is a top plan view showing a flat pattern for a soft material insert detachably connectable to the armrest.

DETAILED DESCRIPTION OF THE PREFERRED EMBODIMENT

Figure 5:
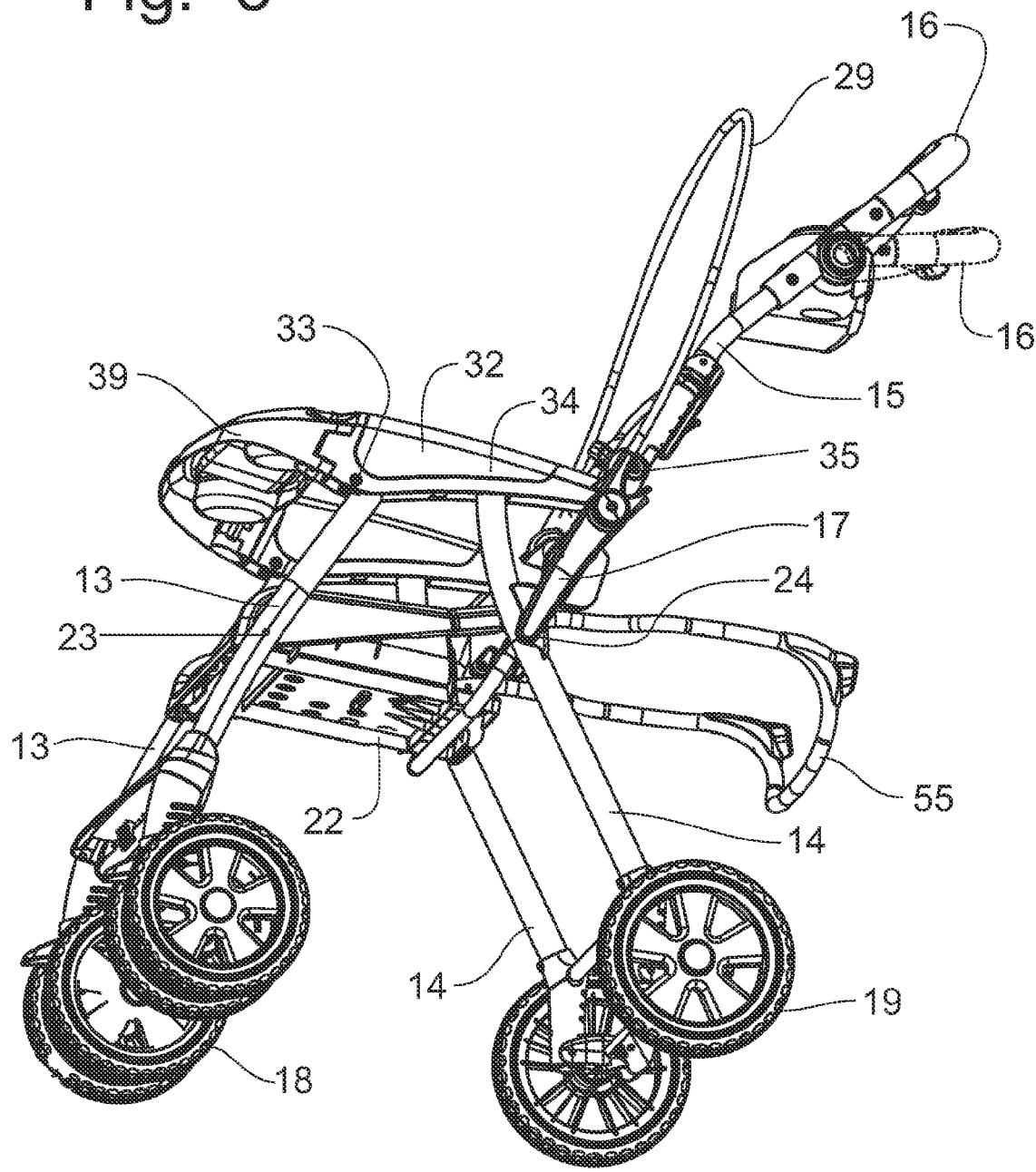
FIG. 5 is a lower, left perspective view of the stroller depicted in FIG. 4.
Figure 6:
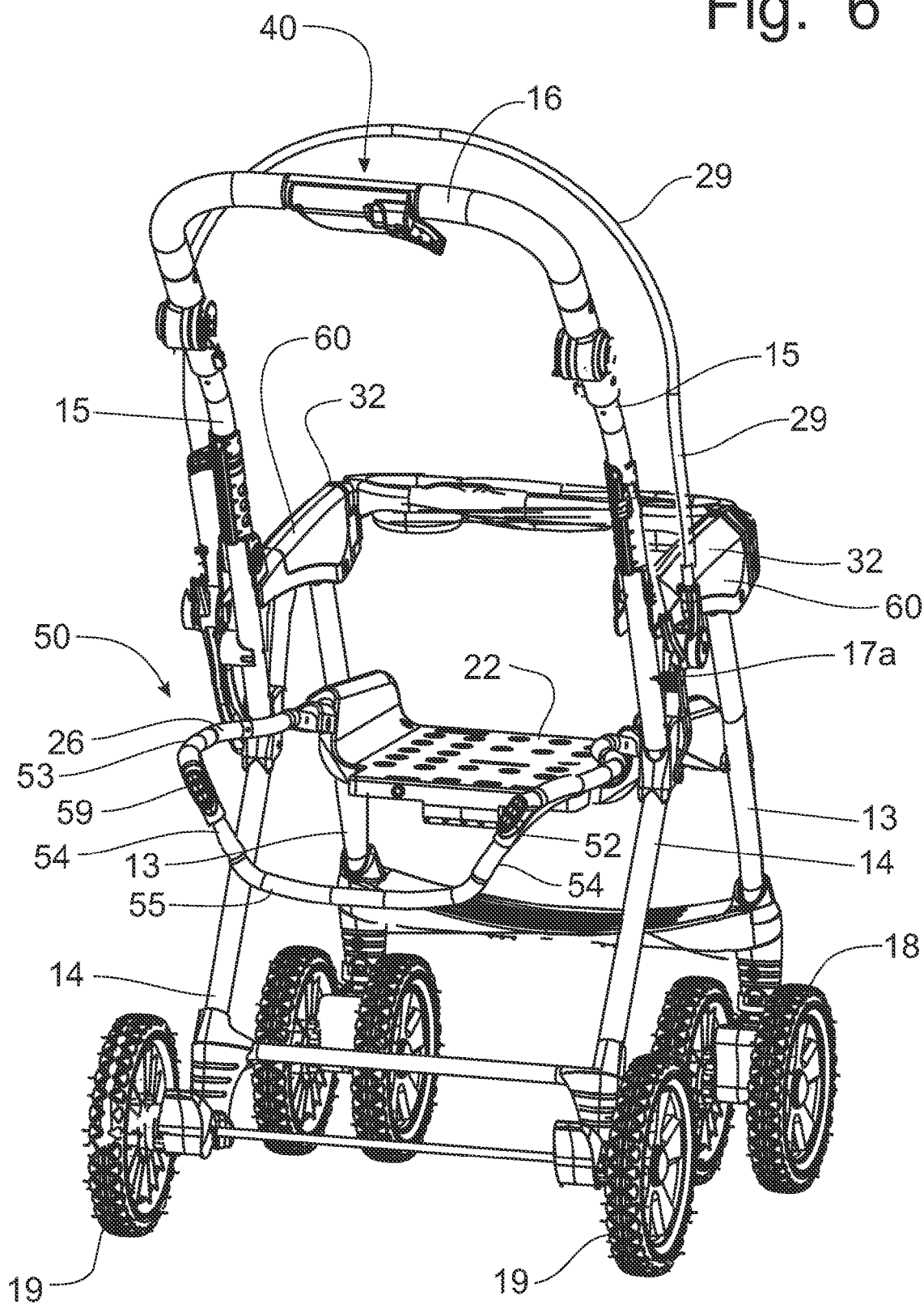
FIG. 6 is a rear perspective view of a stroller similar to that of FIG. 3 and incorporating the principles of the instant invention.

Referring now to FIGS. 1-6, a stroller incorporating the principles of the instant invention can best be seen. The stroller 10 includes a wheeled frame 12 that is supported on front and rear ground-engaging wheels 18, 19 that permit mobile movement of the stroller 10 over the surface of the ground to transport children. The frame 12 includes a pair of transversely spaced front legs 13 on which the front wheels 18 are mounted and a corresponding pair of transversely spaced rear legs 14 on which the rear wheels 19 are mounted. The frame also includes a pair of upwardly extending, transversely spaced handle tubes 15 terminating in a handle bar 16 defining a preferred generally inverted U-shaped configuration. As seen in FIG. 5, the handle bar 16 is preferably positionally adjustable about a pivot axis corresponding to the mounting of the cup holder. Interconnecting the front and rear legs 13, 14 and the handle tubes 15 in a manner described in greater detail below are generally horizontally oriented seat assembly 20 and an arm rest and tray assembly 30.

The front legs 13 are pivotally connected to the arm rest assembly 30 about a first pivot 33, while the rear legs 14 are pivotally connected to the arm rest assembly 30 about a second pivot 34 spaced rearwardly of the first pivot 33. Additionally, the front legs 13 are pivotally connected to the seat assembly 20 about a first seat pivot 23. Furthermore, the arm rest assembly 30 is pivotally connected to the handle tubes 15 about a third pivot 35 and the seat assembly 20 is pivotally connected to the handle tubes about a second seat pivot 25 that is located along the handle tubes 15 below the third arm rest pivot 35.

The handle tubes 15 are articulated about an articulation pivot axis 17a to a lower stabilization member 17, which is pivotally connected to the rear legs 14 about a pivot 24. The handle tubes 15 are provided with a latch mechanism 40 that includes retractable latch members housed within the handle tubes 15 to lock the handle tubes 15 to the rear legs 14 in an upright orientation. The retraction of the latch members allows an articulation of the handle tubes 15 relative to the stabilization members 17 to accomplish a folding of the stroller frame 12 into a compact storage configuration. The movement of the latch members is controlled by a latch actuation mechanism 45, including a trigger-like handle 46, located in the handle bar 16.

Figure 1:
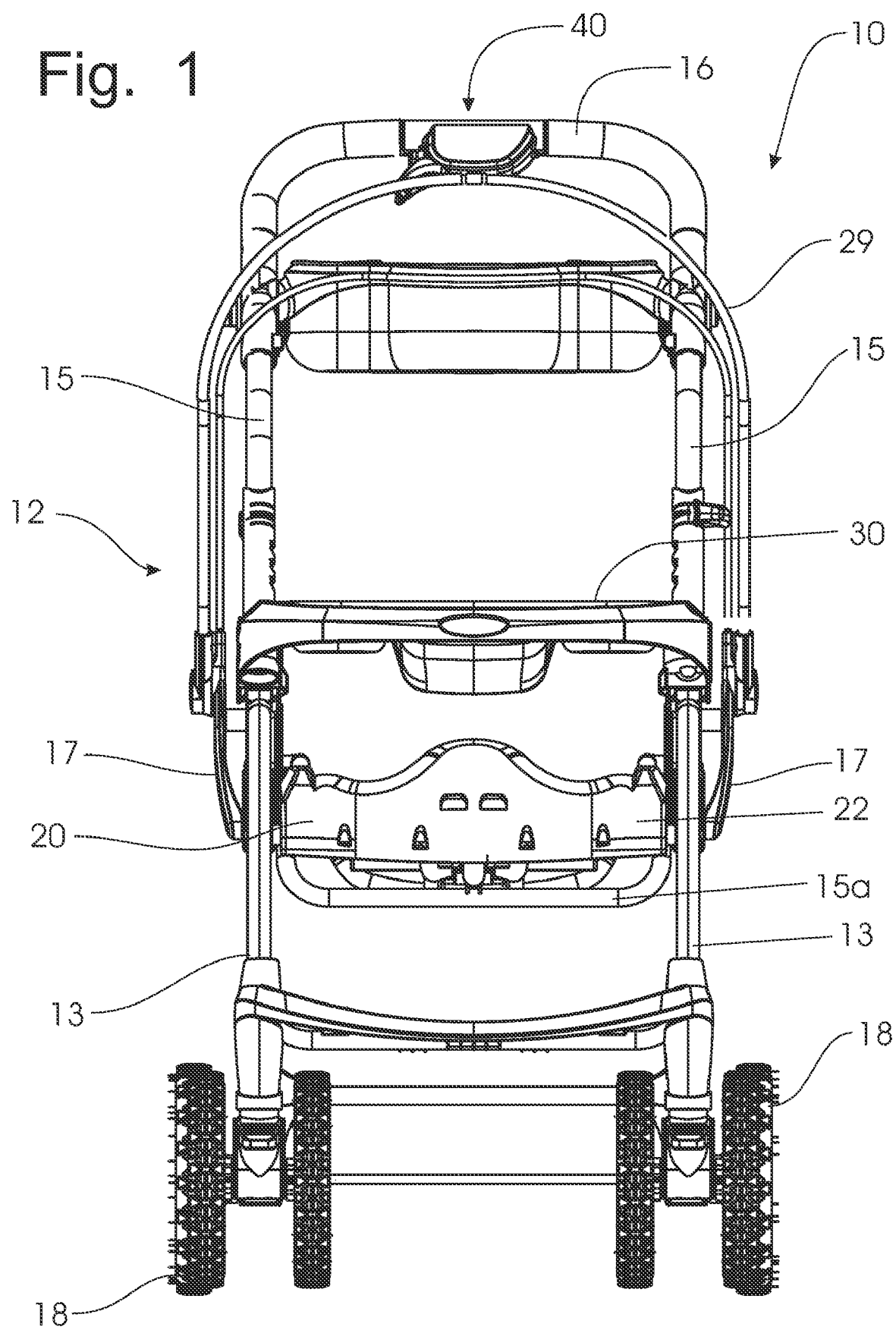
FIG. 1 is a front elevational view of a first embodiment of a stroller incorporating the principles of the instant invention, the conventional fabric portions of the stroller forming the seat cushion, hood and other non-frame components of the stroller being removed for purposes of clarity.
Figure 2:
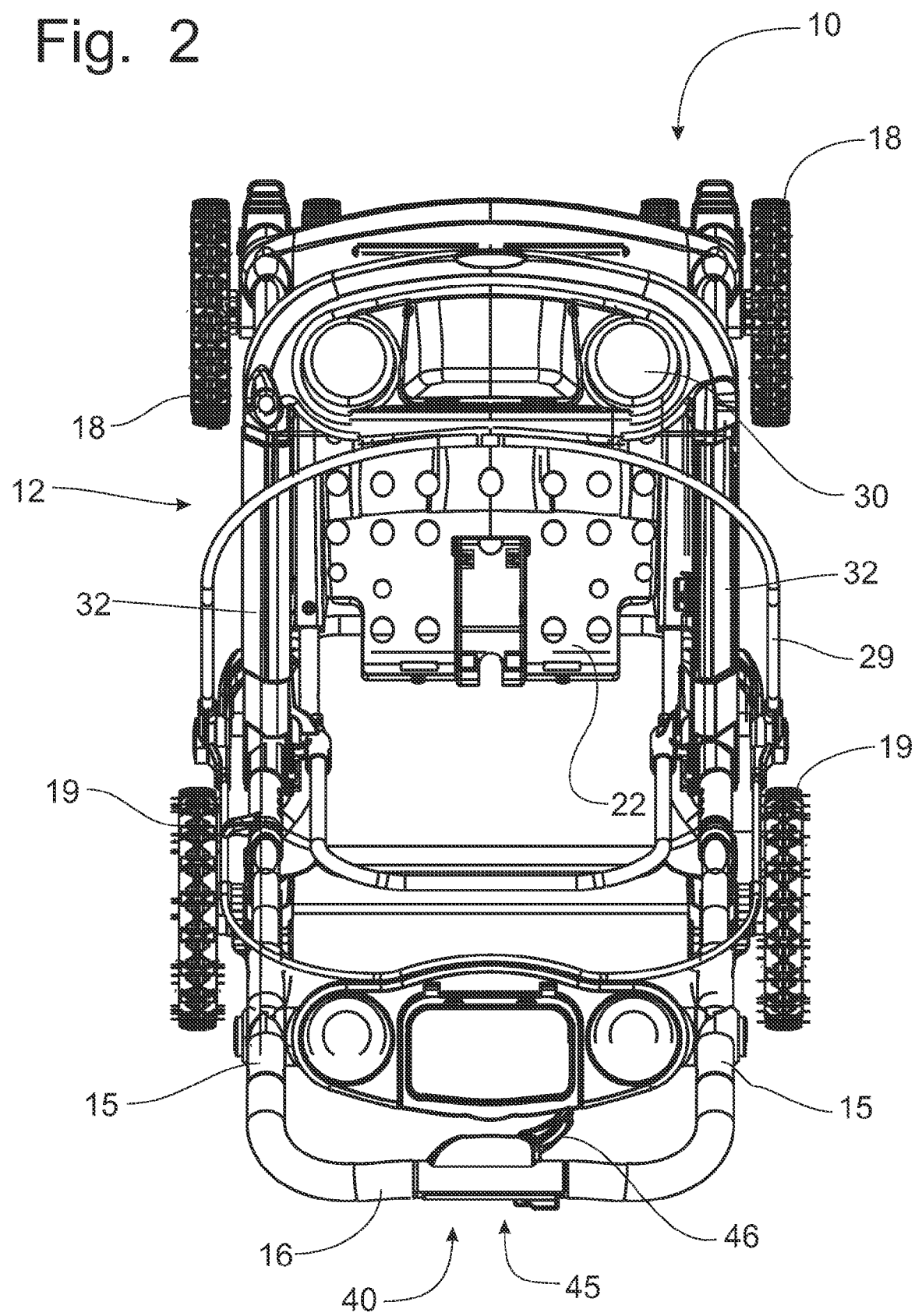
FIG. 2 is a top plan view of the stroller shown in FIG. 1.
Figure 3:
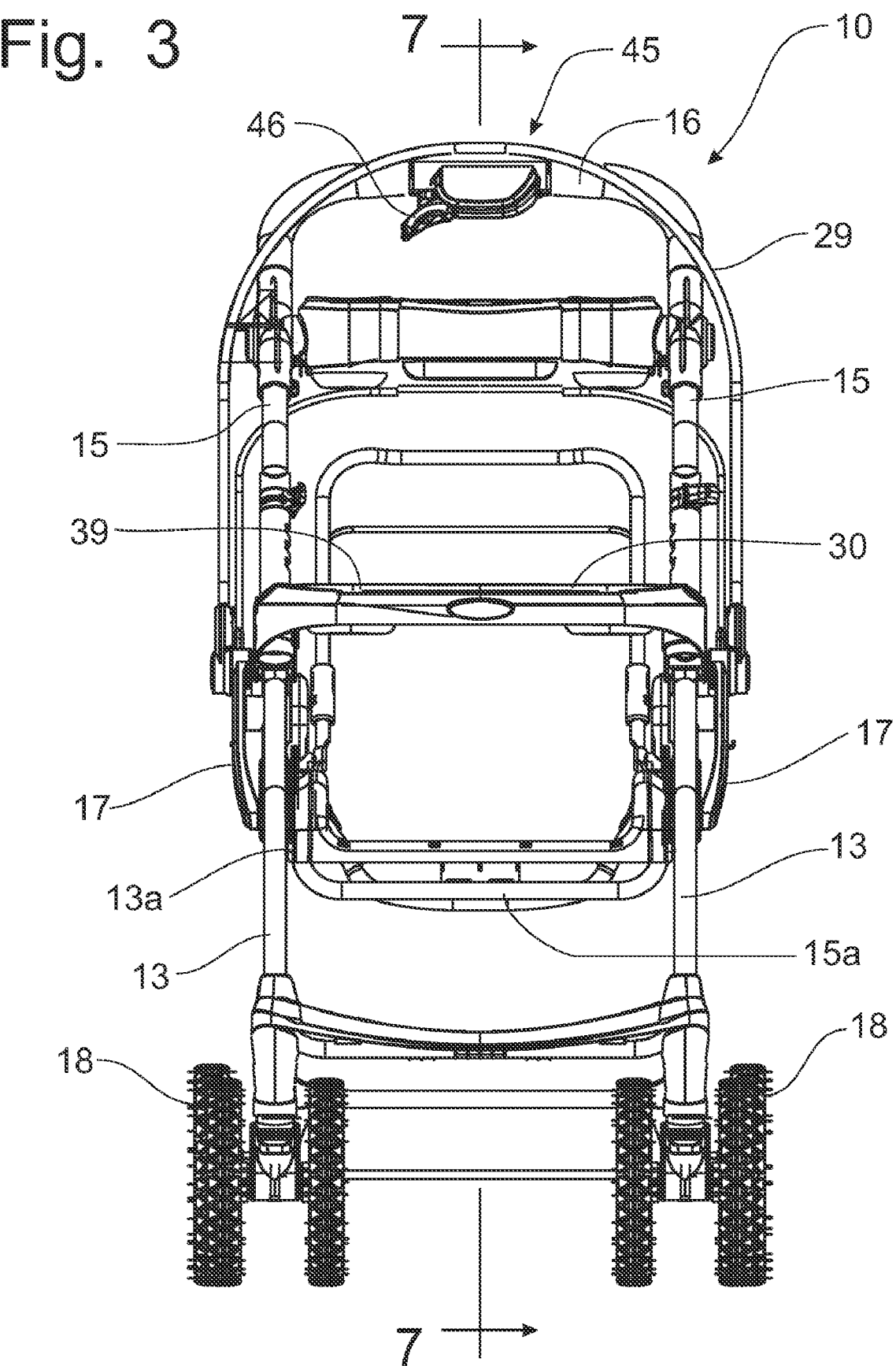
FIG. 3 is a front elevational view of a second embodiment of a stroller incorporating the principles of the instant invention, like FIG. 1, the conventional fabric portions of the stroller forming the seat cushion, hood and other non-frame components of the stroller being removed for purposes of clarity.
Figure 4:
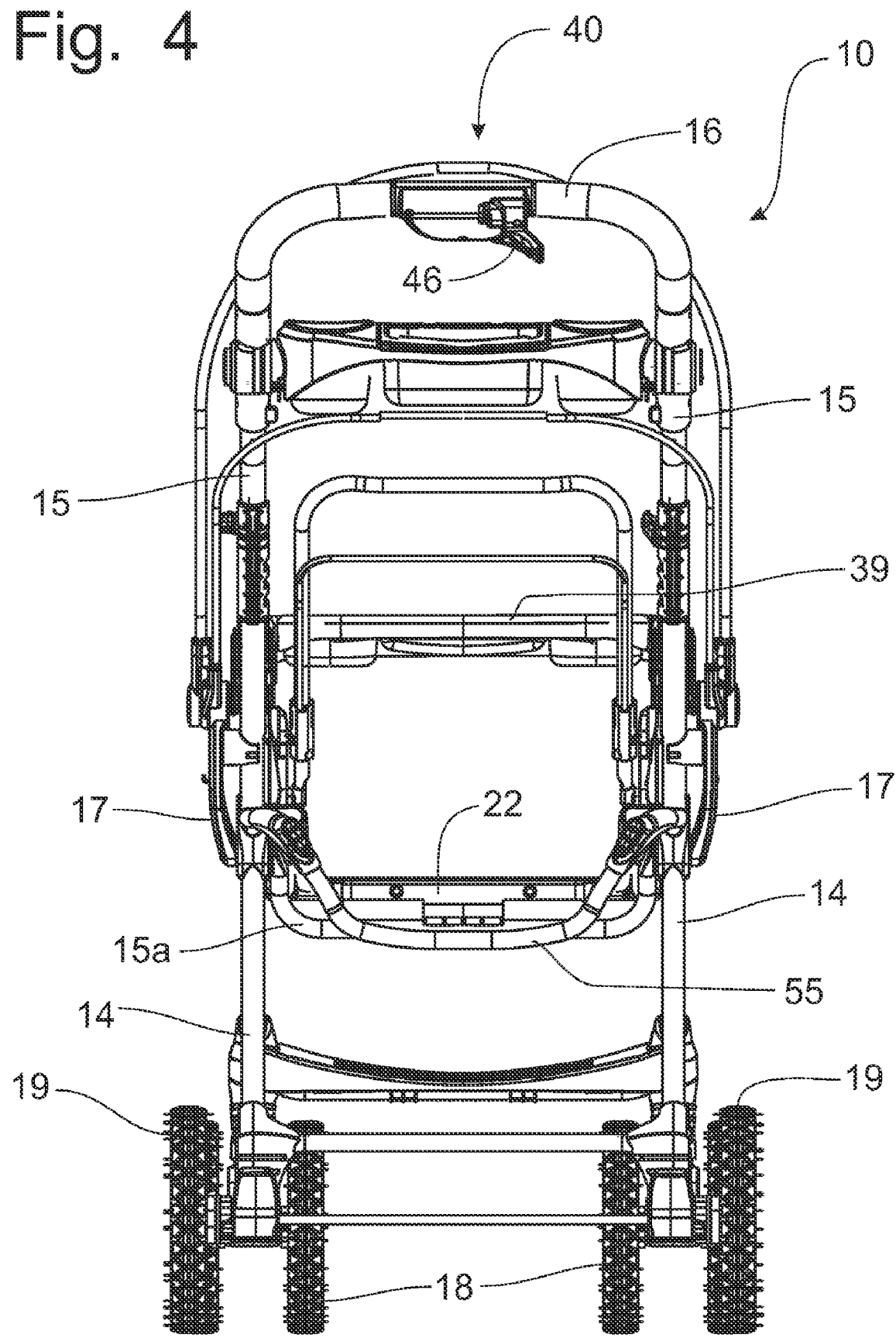
FIG. 4 is a rear elevational view of the stroller depicted in FIG. 3.
Figure 12:
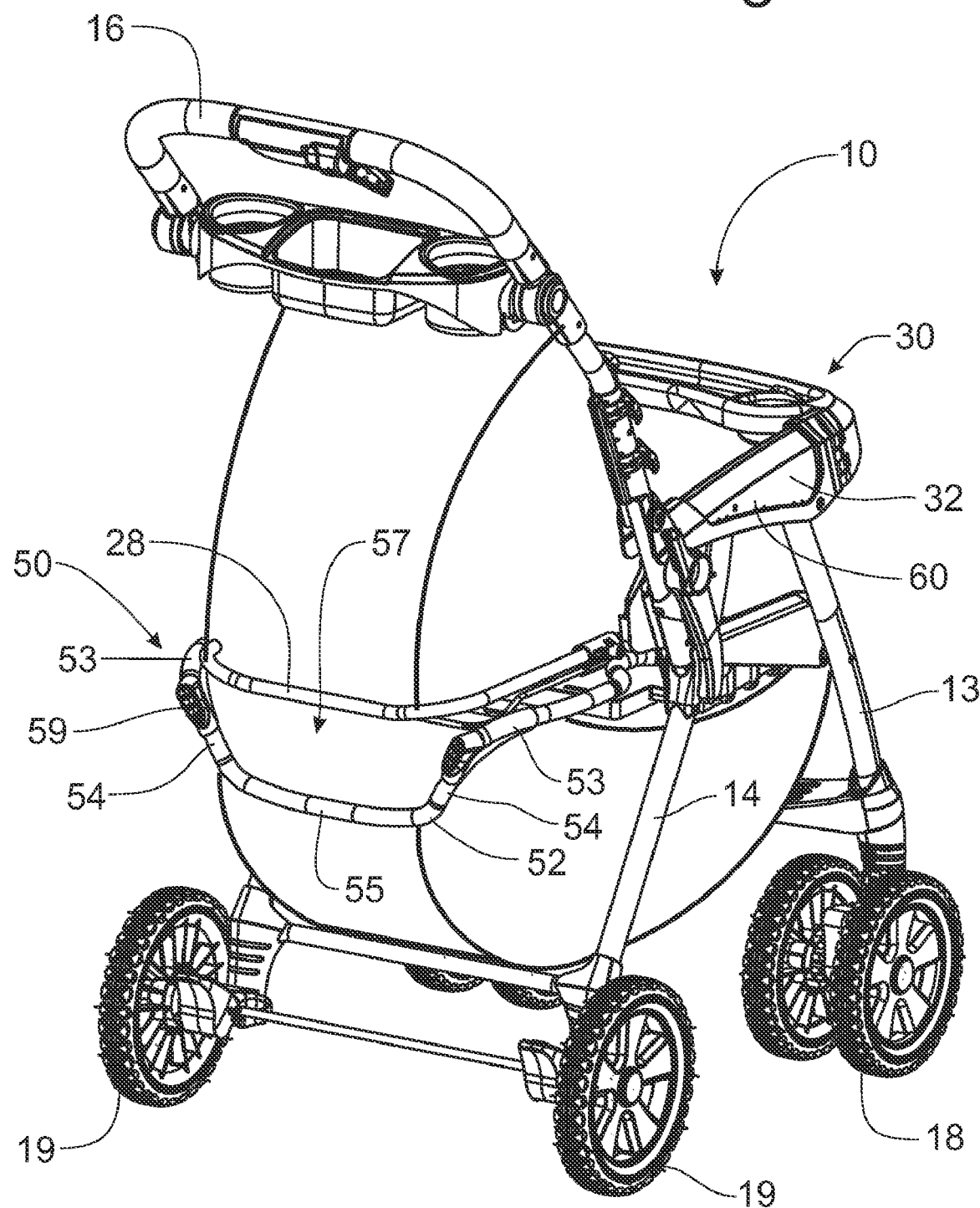
FIG. 12 is a right, rear perspective view of a stroller having the fabric portions attached to the frame and showing the seat back reclined into the lowered position, similar to that of FIG. 10, to depict the opening formed by the basket frame to allow access into the basket even when the seat back is reclined.

The seat assembly 20 is formed with a seat pan 22 that can be in a formed shape as depicted in FIGS. 1 and 2, or in a generally planar configuration as is depicted in FIGS. 3-6. One of the differences between the shape of the seat pan 22 in FIG. 1 and in FIG. 3 is the formation of the seat to conform to an ASTM standard that either prevents a child from passing between the seat 22 and the tray 39, or allows the entire body of the child to pass between the seat 22 and the tray 39. Projecting rearwardly from the seat pan 22 is a pair of transversely spaced seat tubes 26 that support the seat pan 22 and connect with a basket structure 50 that continues rearwardly from the seat tubes 26 to provide support for a basket (not shown) in which loose items can be stored when the stroller 10 is in the operative configuration. A seat back 28 is pivotally mounted from the seat pan 22 and is movable between an upright position that establishes a conventional seat for the child on the seat pan 22, and a reclined position, as depicted in FIGS. 10 and 12, which provides a place for the child to sleep.

The arm rest and tray assembly 30 is formed with a pair of transversely spaced arm rests 32 interconnected at the forward ends thereof by a tray 39 that is pivotally connected to one of the arm rests 32 and latched to the opposing arm rest 32 such that the tray 39 can be disconnected from the latched arm rest 32 and pivoted about the other arm rest 32 to permit access into the seat assembly 20 onto which a child can be seated. One of ordinary skill in the art will recognize that the stroller frame 12 is depicted in FIGS. 1-6, and in other figures as well, without the fabric and padding, commonly referred to as the soft goods, which is mounted on the frame 12 to provide an aesthetically pleasing and comfortable stroller 10 on which a child can be transported from place to place. For example, in some of the figures, the canopy hoop 29 is depicted on which a canopy cover (not shown) is attached to form a cover that extends over the child positioned in the seat 22, the canopy hoop being pivotably connected to the handle tubes 15 or stabilizer members 17 to move between a retracted position adjacent the handle tubes 15 and a lowered position adjacent the arm rests 32.

As can be seen through a comparison of FIGS. 7 and 8, the operative and storage configurations of the stroller 10 can best be seen. The latch mechanism 40 is operable to prevent the articulation of the handle tubes 15 and, thereby, lock the stroller frame 12 in the operative configuration shown in FIG. 7. With the handle tubes 15 locked against articulation, the frame components are not able to pivot relative to one another. When the latch mechanism 40 is withdrawn from the rear legs 14, the articulation of the handle tubes 15 allows the front leg 13 to pivot relative to the seat assembly 20 and the arm rest assembly 30, while the articulating handle tubes 15 lower the rearward end of the arm rest assembly 30 toward the seat assembly 20, which in turn pivots about the pivot 25 to allow the entire frame 12 to collapse into the storage configuration depicted in FIG. 8.

As is best seen in FIGS. 5, 6 and 9-11, the basket structure 50 is formed of a basket tube 52 that is connected to the seat tubes 26 and extends rearwardly thereof. The basket tube 52 is preferably a single, formed tubular member that has two ends engaged into the seat tubes 26. From the seat tubes 26 the basket tube extends rearwardly and preferably flares outwardly at bend 53 to expand the overall width of the basket structure 50. At the rearward end of the basket tube 52, the tube 52 bends downwardly at bend 54 through a generally vertical bend of approximately 90 degrees, while closing inwardly slightly, as is best seen in FIG. 10. The basket tube 52 then is formed with a generally horizontally extending member 55 that is, due to the bends 54, located vertically below the side portions of the basket tube 52 defined by the horizontal bends 53. The vertically recessed position of the horizontal member 55, compared to the side portions of the basket structure 50, establishes an access opening 57 into the interior of the basket structure 50.

When the seat back 28 is raised, access into the interior of the basket structure 50 is not a problem as substantially the entire basket structure 50 is opened for access. When, however, the seat back 28 is lowered to allow the child in the stroller 10 to sleep, the lowered seat back 28, as is seen in FIGS. 10 and 12, occludes the top portion of the basket structure 50 and, thus, according to the known prior art blocks access into the basket structure until the seat back 28 is raised, which typically disturbs the child's sleep. With the vertically recessed horizontal member 55, the basket tube 52 from the vertical bends 54 through the horizontal member 55, defines the generally vertical opening 57 that is located beneath the reclined seat back 28 to permit access into the interior of the basket structure 50 even when the seat back is reclined.

The convenience of the vertical opening 57 is readily apparent upon viewing FIGS. 10 and 12. Even with the seat back 28 lowered, access into the interior of the basket structure 50 below the reclined seat back 28 is easily accomplished. While the vertically recessed position of the horizontal member 55 may lower the storage capacity of the basket structure 50 slightly, one skilled in the art will recognize that the typical items carried around in a stroller basket are usually fairly large and are not typically subject to being rolled out of the basket structure 50.

Referring now to FIGS. 13-15, a replaceable cover 60 for the arm rest 32 can best be seen. Each arm rest 32 is formed with a recessed insert area 37 that extends over a substantial portion of the arm rest 32 beginning rearwardly of the connection at the forward end of the arm rest 32 with the tray 39 and covering the portion of the arm rest 32 that is typically engaged by a child positioned on the seat pan 22. The recessed insert area 37 has a recessed depth substantially equal to the thickness of the replaceable cover member 60. Therefore, the top surface of the replaceable cover 60 is generally coextensive with the top surface of the plastic portion of the arm rest that is forward of and rearward of the replaceable cover 60.

The arm rest 32 is also formed with tabs 38 positioned at the lower extremities of the recessed insert area 37 and projecting inwardly toward the insert area 37 to engage connection openings 61 formed into the replaceable cover member 60 along the periphery thereof, as is best seen in the flat pattern of the replaceable cover member 60 in FIG. 15. Preferably, the cover member 60 is formed of ethyl vinyl acetate (EVA) which provides a durable top surface and a comfortable soft feel to the child engaging the cover 60. Furthermore, the EVA material is washable, both while on the arm rest 32 and while removed from the arm rest 32. One skilled in the art will recognize that other fabric or padded fabric materials would also provide acceptable service as a replaceable cover 60.

For installation, the cover 60 is pressed along one side of the arm rest 32 into the recessed insert area 37 until the tabs 38 are engaged within the connection openings 61 in the cover member 60. The cover 60 is then wrapped around the recessed insert area 37 to cover the sides and the top of the arm rest 32, and then pressed into the opposing side of the arm rest 32 until the tabs 38 on the opposing side of the arm rest 32 engage the corresponding connection openings 61 to affix the replaceable cover member 60 to the arm rest 32. Removal of the cover 60 requires that the tabs 38 be disengaged from the connection openings 61 so that the cover 60 can be lifted off of the recessed insert area 37 to be cleaned and returned to the arm rest 32, or simply replaced by a new cover 60.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A stroller for transporting a child comprising:
   a frame having front legs and rear legs terminating in ground engaging wheels, and an articulated handle assembly, said front legs, rear legs and handle assembly being pivotally interconnected to permit said frame to be positionable between an expanded operative configuration and a collapsed storage configuration;
   a seat assembly pivotally connected to said frame, said seat assembly including a seat pan on which the child can be seated when said frame is in said operative configuration and a seat back pivotally connected to said seat pan to be movable between an upright position and a reclined position; and
   a basket apparatus supported from said frame and extending rearwardly of said seat assembly, said basket apparatus having a basket tube including a pair of transversely opposed horizontally extending portions defining a horizontal plane and a rearward portion having a transversely oriented cross member, each of said horizontal portions terminating at a rearward terminus and being connected to a vertical portion to which said cross member is connected so that said cross member is located directly vertically below said rearward terminuses of said horizontally extending portions to define a rearwardly facing access opening into said basket apparatus that is located below said horizontally extending portions, between said vertical portions and above said cross member, each said horizontal portion including an outwardly flared portion and each said vertical portion including a vertical bend that also bends inwardly to connect with said transverse cross member.

2. The stroller of claim 1 wherein said seat back when in said reclined position is located adjacent said horizontally extending portions of said basket tube, said access opening being positioned below said reclined seat back.

3. The stroller of claim 2 wherein said seat assembly includes a pair of rearwardly extending seat tubes, said horizontally extending portions of said basket tube being connected to corresponding said seat tubes.

4. The stroller of claim 2 wherein said horizontally extending portions, said vertical portions and said transverse cross member are formed as a single tubular member.

5. The stroller of claim 2 wherein each of said vertical portions has a foot mounted thereon to support said stroller when placed into said storage configuration.

6. The stroller of claim 2 wherein each said horizontal portion has an outwardly flared portion to which the corresponding said vertical portion is connected.

7. A basket apparatus for a child's stroller having an articulated frame pivotally movable between an expanded operative configuration and a folded storage configuration, said frame supporting a seat assembly having a seat back pivotally movable between an upright position and a lowered reclined position, comprising:

a basket tube including a pair of horizontal portions extending rearwardly of said seat assembly in a horizontal plane and terminating in a rearward terminus to which are connected vertical portions that are interconnected by transversely oriented cross member so that said cross member is located directly vertically downward from the rearward terminus of each horizontal portion by an offset dimension to define a rearwardly facing access opening into an interior portion of said basket apparatus that is located below said horizontal portions, between said vertical portions and above said cross member, and has a vertical height defined by said offset dimension, each said horizontal portion including an outwardly flared portion and each said vertical portion including a vertical bend that also bends inwardly to connect with said transverse cross member.

8. The basket apparatus of claim 7 wherein said seat back, when in said lowered reclined position, is located adjacent said horizontal portions of said basket tube, said access opening being located below said reclined seat back.

9. The basket apparatus of claim 8 wherein said seat assembly includes a pair of rearwardly extending seat tubes, said horizontal portions of said basket tube being connected to corresponding said seat tubes.

10. The basket apparatus of claim 8 wherein said horizontal portions, said vertical portions and said transverse cross member are formed as a single tubular member.

11. The basket apparatus of claim 10 wherein each of said vertical portions has a foot mounted thereon to support said stroller when placed into said storage configuration.

12. In a stroller having a frame including front legs and rear legs terminating in ground engaging wheels, a handle assembly, said front legs, rear legs and handle assembly being pivotally interconnected to permit said frame to be positionable between an expanded operative configuration and a collapsed storage configuration; and a seat assembly pivotally connected to said frame and including a seat back pivotally supported for movement between an upright position and a lowered reclined position, the improvement comprising:

a basket apparatus extending rearwardly of said seat assembly and having a basket tube formed with a pair of horizontal portions terminating at respective rearward terminuses and having a vertical portion extending downwardly from each rearward terminus and a transverse cross member that interconnects said vertical portions so as to be located directly vertically below said rearward terminuses by an offset dimension to define a rearwardly facing access opening into said basket apparatus that is located below said seat back when in said lowered reclined position, each said horizontal portion including an outwardly flared portion and each said vertical portion including a vertical bend that also bends inwardly to connect with said transverse cross member.

13. The stroller of claim 12 wherein each said horizontal portion has an outwardly flared portion to which the corresponding said vertical portion is connected.

14. The stroller of claim 13 wherein said horizontal portions, said vertical portions and said transverse cross member are formed as a single tubular member.

15. The stroller of claim 14 wherein said seat assembly includes a pair of rearwardly extending seat tubes, said horizontal portions of said basket tube being connected to corresponding said seat tubes.

* * * * *